United States Patent
Julliard et al.

(10) Patent No.: US 9,546,602 B2
(45) Date of Patent: Jan. 17, 2017

(54) MULTI-LAYER ACOUSTIC TREATMENT PANEL

(75) Inventors: Jacques Michel Albert Julliard, Hericy (FR); Jacky Novi Mardjono, Nogent sur Marne (FR); Georges Jean Xavier Riou, Melun (FR); Benjamin Andre Francois Poirier, Saint Augustin (FR); Jean-Michel Jean-Francois Ville, Compiegne (FR)

(73) Assignees: SNECMA, Paris (FR); CENTRE NATIONAL DE LA RECHERCHE SCIENTIFIQUE, Paris (FR); UNIVERSITE DE TECHNOLOGIE DE COMPIEGNE, Compiegne (FR)

( * ) Notice: Subject to any disclaimer, the term of this patent is extended or adjusted under 35 U.S.C. 154(b) by 1095 days.

(21) Appl. No.: 13/698,209

(22) PCT Filed: May 12, 2011

(86) PCT No.: PCT/FR2011/051062
§ 371 (c)(1),
(2), (4) Date: Feb. 19, 2013

(87) PCT Pub. No.: WO2011/144842
PCT Pub. Date: Nov. 24, 2011

(65) Prior Publication Data
US 2013/0142624 A1 Jun. 6, 2013

(30) Foreign Application Priority Data

May 19, 2010 (FR) ...................................... 10 53881

(51) Int. Cl.
*F02C 7/045* (2006.01)
*F02K 1/82* (2006.01)
(Continued)

(52) U.S. Cl.
CPC ................. *F02C 7/24* (2013.01); *F02K 1/827* (2013.01); *G10K 11/168* (2013.01)

(58) Field of Classification Search
CPC .. B64C 21/02; B64D 2033/0206; F02C 7/045; F02K 1/827; F04D 29/664; F04D 29/665; F05D 2260/963
(Continued)

(56) References Cited

U.S. PATENT DOCUMENTS 4,327,816 A * 5/1982 Bennett ................ G10K 11/172
181/224
5,912,442 A 6/1999 Nye et al.
(Continued)

FOREIGN PATENT DOCUMENTS

| CN | 101675226 A | 3/2010 |
|----|-------------|--------|
| EP | 1 482 478 A2 | 12/2004 |
| JP | 8 30277 | 2/1996 |

OTHER PUBLICATIONS

International Search Report Issued May 10, 2012 in PCT/FR11/051062 Filed May 12, 2011.
(Continued)

*Primary Examiner* — Sean J Younger
(74) *Attorney, Agent, or Firm* — Oblon, McClelland, Maier & Neustadt, L.L.P.

(57) ABSTRACT

A multilayer acoustic treatment panel including a first cellular-structure core sandwiched between a perforated skin and an intermediate skin; and a second cellular-structure core sandwiched between the intermediate skin and a continuous skin. The perforated skin includes at least one pair of high-porosity zones presenting a perforation ratio greater than a perforation ratio of a remainder of the perforated skin and including an inlet zone and an outlet zone longitudinally spaced apart from each other, the high-porosity zones of a given pair communicating through the first cellular-structure
(Continued)

core and the intermediate skin with the two ends of a soundwave flow channel arranged in the second cellular-structure core.

13 Claims, 4 Drawing Sheets

(51) Int. Cl.
  *F02C 7/24* (2006.01)
  *G10K 11/168* (2006.01)
(58) Field of Classification Search
  USPC .................................................. 415/119
  See application file for complete search history.

(56) References Cited

U.S. PATENT DOCUMENTS

| | | | | |
|---|---|---|---|---|
| 6,085,865 | A * | 7/2000 | Delverdier | B32B 3/12 |
| | | | | 181/286 |
| 6,135,238 | A * | 10/2000 | Arcas | B64C 21/04 |
| | | | | 181/213 |
| 6,827,180 | B2 * | 12/2004 | Wilson | B32B 3/20 |
| | | | | 181/292 |
| 7,047,725 | B2 * | 5/2006 | Moe | F02C 7/045 |
| | | | | 181/210 |
| 2002/0036115 | A1 | 3/2002 | Wilson | |
| 2004/0237502 | A1 | 12/2004 | Moe et al. | |
| 2006/0169532 | A1 * | 8/2006 | Patrick | F02C 7/045 |
| | | | | 181/210 |
| 2010/0133378 | A1 | 6/2010 | Lidoine | |

OTHER PUBLICATIONS

English translation of the Office Action issued Aug. 26, 2014, in Chinese Patent Application No. 201180024607.8.

* cited by examiner

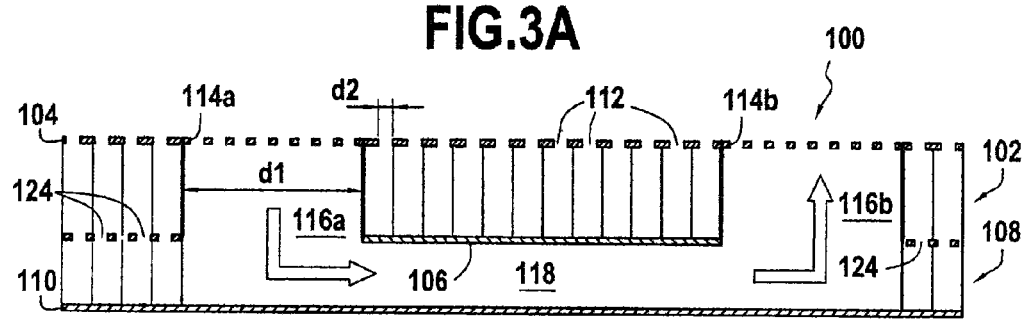
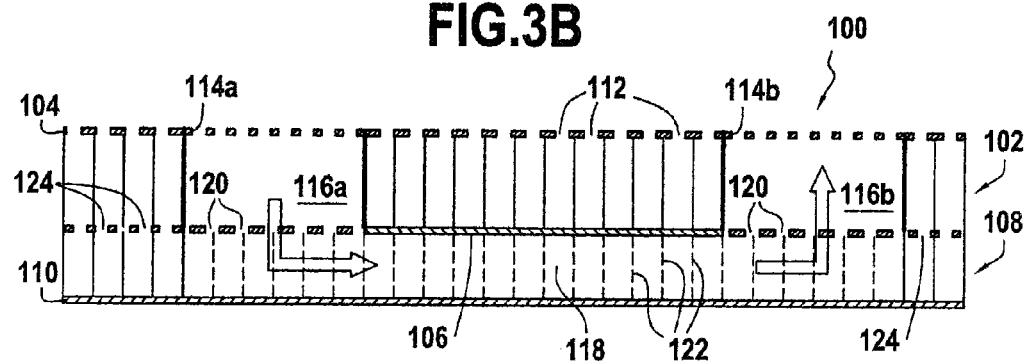
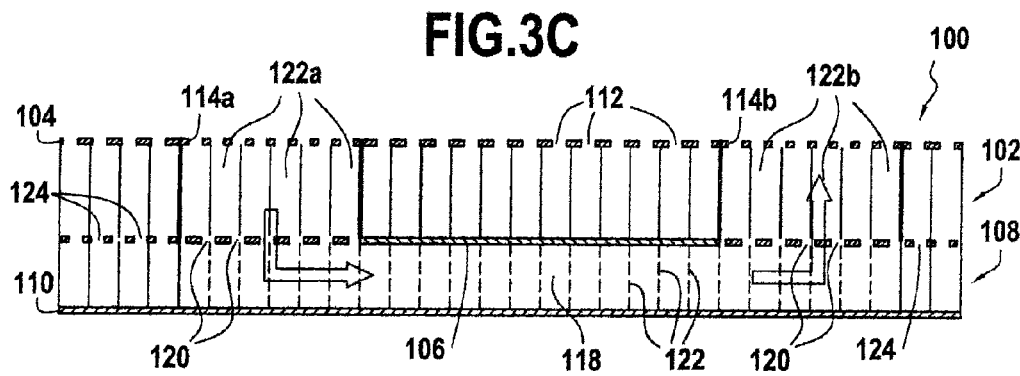

MULTI-LAYER ACOUSTIC TREATMENT PANEL

BACKGROUND OF THE INVENTION

The present invention relates to the general field of so-called "passive" acoustic treatment.

The application domain of the invention is particularly, but not exclusively, that of aviation turbine engines.

The use of passive acoustic treatment panels is frequent in the field of aviation in order to reduce the emission of sound from turbine engines. For example, with a two-spool bypass type turbojet, such panels may be arranged on the inside face of the nacelle that surrounds the turbojet, and also on the outside face of its primary cover.

A passive acoustic treatment panel is generally constituted by a honeycomb cellular structure covered by a thin porous layer acting as a wall for a gas flow passage and closed on its other side by a layer that is reflective from an acoustic point of view (also referred to as a continuous skin). More complex panels with intermediate porous layers inserted between honeycomb structure layers may be provided in order to extend attenuation over a broader frequency range. The present invention applies more particularly to such an acoustic treatment panel known as a "multilayer" panel.

It is known that sound attenuation is much more effective when the helical acoustic modes on which sound energy propagates are of high order. These acoustic modes remain in the ducts for longer and they present energy closer to the wall, thereby facilitating dissipation of their energy by panels placed on the walls of the nacelle or of the turbojet. In addition, the sound attenuation of an acoustic treatment panel varies in relatively linear manner up to a certain treatment length, and beyond that length sound attenuation increases much more slowly. Such behavior may be explained by the variation in the characteristics of the source sound that, as it propagates through the panel, becomes less and less rich in high-order acoustic modes. Since sound attenuation depends on which acoustic modes are present, the presence of a larger number of low-order acoustic modes for transporting the remaining acoustic energy implies that the absorption efficiency of the panels is smaller. Unfortunately, presently-used acoustic treatment panels do not enable these two requirements to be satisfied.

OBJECT AND SUMMARY OF THE INVENTION

A main object of the present invention is thus to mitigate such drawbacks by proposing to increase the effectiveness of acoustic treatments for a given treated surface area by acting on the characteristics of the sound source.

This object is achieved by a multilayer acoustic treatment panel comprising a first cellular-structure core sandwiched between a perforated skin and an intermediate skin; and a second cellular-structure core sandwiched between the intermediate skin and a continuous skin, in which panel, in accordance with the invention, the perforated skin includes at least one pair of high-porosity zones presenting a perforation ratio greater than the perforation ratio of the remainder of the perforated skin and formed by an inlet zone and an outlet zone that are longitudinally spaced apart from each other, the high-porosity zones of a given pair communicating through the first cellular-structure core and the intermediate skin with the two ends of a soundwave flow channel arranged in the second cellular-structure core.

The presence of high-porosity zones in the perforated skin of the panel serves to create a large impedance discontinuity over a small area, thereby causing some of the energy of the low order acoustic modes to transfer to high-order acoustic modes, which are easier to attenuate acoustically. In addition to this effect of converting acoustic modes, in particular for broadband noise, because the panel of the invention has soundwave flow channels it also modifies the path of a fraction of the soundwave captured through the inlet zones in order to reinject it in phase opposition via outlet zones further downstream. This serves to enhance the attenuation of troublesome frequencies corresponding to the operating ranges of the turbojet. Thus, for given surface area, it is possible to increase considerably the effectiveness of the acoustic treatment panel.

The high-porosity zones of a given pair may communicate with the soundwave flow channel via wells passing both through the first cellular-structure core and the intermediate skin.

In a variant embodiment, the high-porosity zones of a given pair may communicate with the soundwave flow channel via wells passing through the first cellular-structure core and via a plurality of orifices formed through the intermediate skin.

In another variant embodiment, the high-porosity zones of a given pair may communicate with the soundwave flow channel through passages formed between the cavities of the first cellular-structure core and a plurality of orifices formed through the intermediate skin.

Preferably, the zones of the intermediate skin covering the soundwave flow channel are continuous.

The soundwave flow channel may be formed by a corridor that is defined laterally by walls of the second cellular-structure core. Alternatively, the soundwave flow channel may be formed by an array of adjacent cavities of the second cellular-structure core that communicate with one another via porous walls.

Preferably, the perforated skin has a plurality of pairs of high-porosity zones that are transversely spaced from one another. Under such circumstances, the inlet zones and the outlet zones may be in alignment in directions that are substantially transverse relative to the panel.

The invention also provides a turbojet nacelle including at least one acoustic treatment panel as defined above on an inside face thereof. The perforated skin of the acoustic treatment panel is then preferably in contact with a cold stream flow passage defined on the outside by the inside face of the nacelle.

The invention also provides a turbojet including at least one acoustic treatment panel as defined above on an outside face thereof. The perforated skin of the acoustic treatment panel is then advantageously in contact with a cold stream flow passage defined on the inside by the outside face of the turbojet.

BRIEF DESCRIPTION OF THE DRAWINGS

Other characteristics and advantages of the present invention appear from the following description made with reference to the accompanying drawings that show embodiments having no limiting character. In the figures:

FIGS. 3A to 3C are section views in the thickness direction of acoustic treatment panels constituting several variant embodiments of the invention;

DETAILED DESCRIPTION OF EMBODIMENTS

Figure 1:
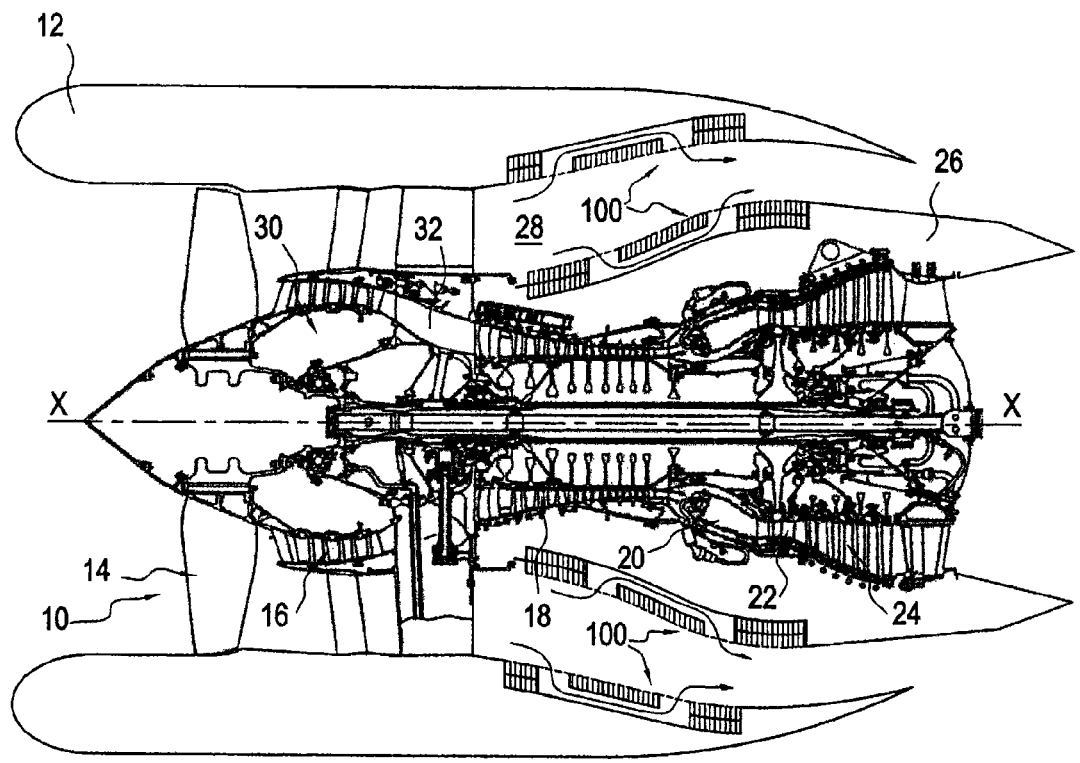
FIG. 1 is a longitudinal section view of a turbojet and its nacelle fitted with acoustic treatment panels of the invention.

The invention relates to a passive acoustic treatment panel, in particular of the type fitted to an aircraft turbojet and its nacelle, as shown in FIG. 1.

The turbojet 10 shown in FIG. 1 is of the two-spool bypass type. It is surrounded by an annular nacelle 12 centered on a longitudinal axis X-X of the turbojet. In known manner, going upstream to downstream, the turbojet comprises: a fan 14; a low pressure compressor 16; a high pressure compressor 18; a combustion chamber 20; a high pressure turbine 22; and a low pressure turbine 24.

The nacelle 12 surrounds the primary cover 26 of the turbojet, being coaxial thereabout in order to define a flow passage 28 for passing a cold gas stream. Similarly, the primary cover 26 surrounds the central body 30 of the turbojet coaxially so as to define a flow passage 32 for passing the hot stream. Thus, the passage 28 is defined radially on the outside by the inside face of the nacelle and on the inside by the outside face of the primary cover.

In the description below, the terms "upstream" and "downstream" should be understood as being relative to the flow direction of the gas stream passing through the turbojet.

Downstream from the fan 14 of the turbojet, the inside face of the nacelle 12 includes acoustic treatment panels 100. The same applies to the primary cover 26, on its outside face around the high pressure compressor 18 and the combustion chamber 20. These acoustic treatment panels 100 serve to attenuate the sound nuisance emitted by the turbojet.

Figure 2:
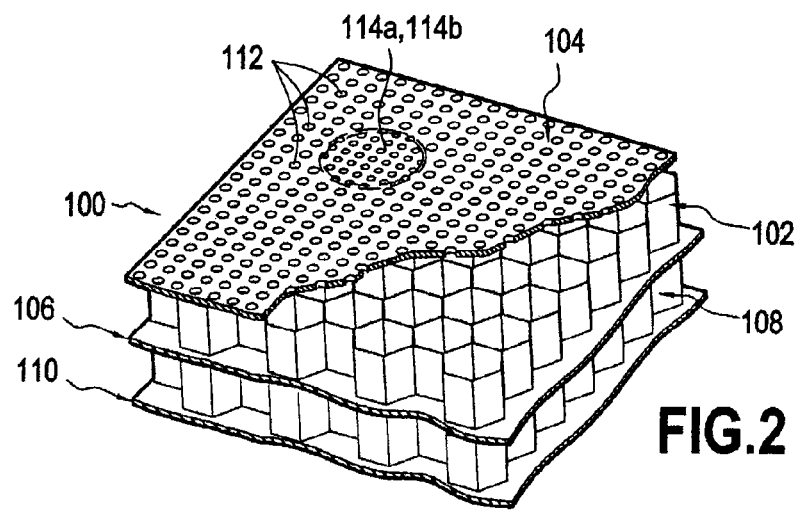
FIG. 2 is a cutaway view on a larger scale of a multilayer acoustic treatment panel of the invention.

FIG. 2 is a more detailed view of an embodiment of an acoustic treatment panel 100 of the invention that is said to be "multilayer", i.e. it is made up of a stack of at least two stages of honeycomb structure.

More precisely, the panel 100 comprises a first cellular-structure core 102 sandwiched between a perforated skin 104 and a partially perforated intermediate skin 106, and a second cellular-structure core 108 sandwiched between the intermediate skin 106 and a continuous skin 110.

The first cellular structure 102 is fastened (e.g. by adhesive or by brazing) to the intermediate skin 106 that acts as a support therefor. Similarly, the second cellular structure 108 is fastened to the continuous skin 110 that acts as a support therefor. Each of these cellular structures 102 and 108 is made up of an array of cavities of honeycomb shape.

Regardless of whether it is installed on the inside of the nacelle or on the outer face of the primary cover of the turbojet, the acoustic treatment panel of the invention is arranged in such a manner that its perforated skin 104 is in contact with the flow passage 28 for the cold stream.

The perforated skin 104 of the acoustic treatment panel has a plurality of through orifices 112 within which the acoustic energy of the sound waves emitted by the turbojet is dissipated by a viscothermal effect. The perforation ratio of the perforated skin (i.e. the ratio of the total area of its perforations to its overall area) lies in the range 7% to 20% (depending on the absorbent structure concept used and on the intended optimum acoustic impedance).

The perforated skin 104 of the acoustic treatment panel of the invention also includes a plurality of pairs of high-porosity zones, i.e. zones of the skin that present a perforation ratio greater than that of the remainder of the skin. The perforation ration in these high-porosity zones preferably lies in the range 20% to 30% (as compared with the perforation ratio of the remainder of the perforated panel which lies in the range 7% to 20%). Such greater porosity is obtained for example by locally increasing the density and/or the diameter of the orifices 112 passing through the perforated skin.

The high-porosity zones present perforation ratios that make them transparent from an acoustic point of view. Such an arrangement serves to minimize aerodynamic losses compared with simple openings of large diameter.

Figure 4A:
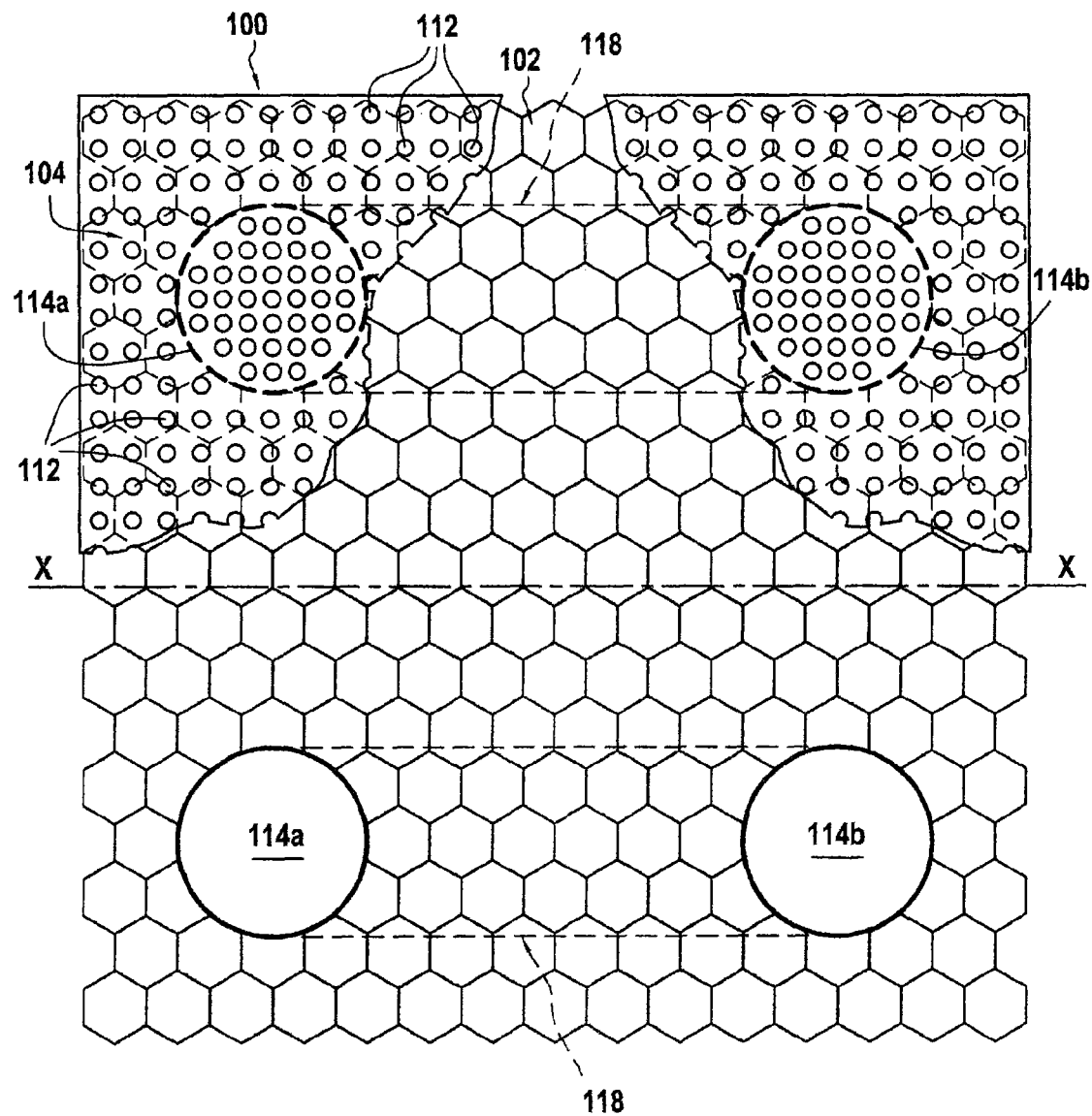
FIGS. 4A and 4B are views of acoustic treatment panels constituting variant embodiments of the invention, as seen from the flow passage side.
Figure 4B:
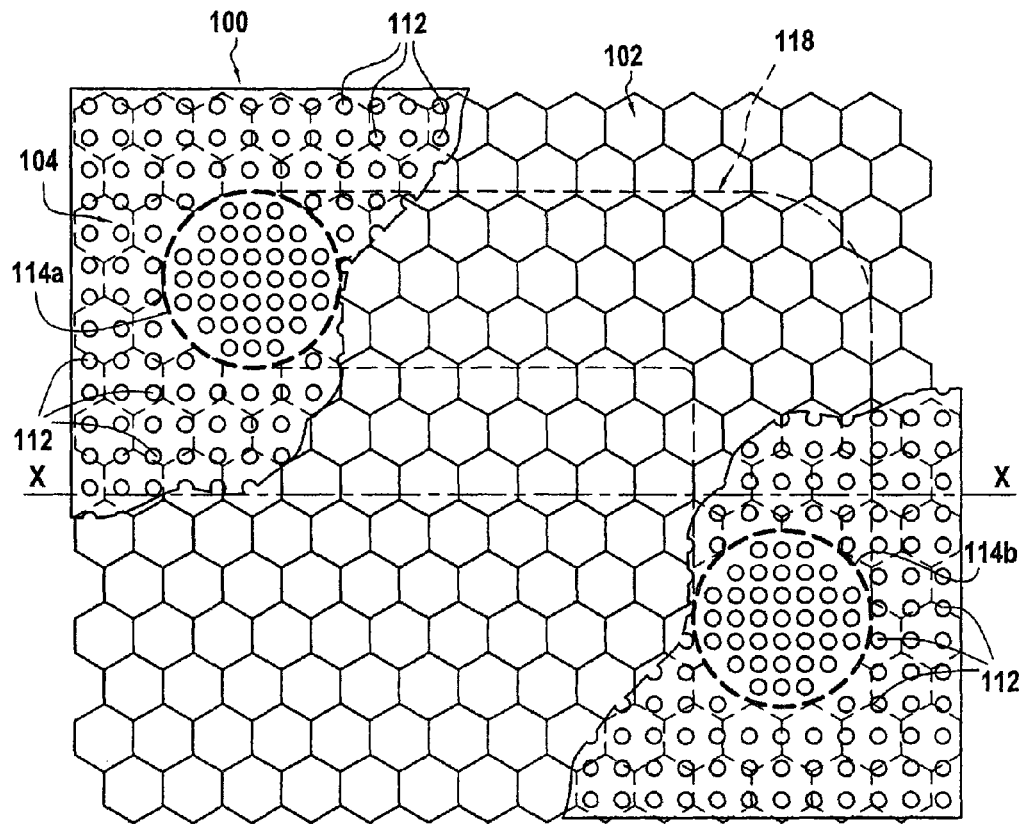

These high-porosity zones 114a, 114b are of a shape that may be circular (as shown in FIGS. 4A and 4B), or that may be square, for example. By way of example, when they are circular in shape, these circular zones of high porosity have a diameter d1 lying in the range 5 centimeters (cm) to 15 cm. By way of comparison, the diameter d2 of the orifices 112 lies in the range 0.75 millimeters (mm) to 2 mm, leading to a ratio d1/d2 lying in the range 25 to 200.

Each pair of high-porosity zones is made up of an inlet zone 114a and an outlet zone 114b, the outlet zone being longitudinally spaced downstream from the inlet zone. Furthermore, for each of the pairs of high-porosity zones, the inlet and outlet zones 114a and 114b communicate via the first cellular-structure core 102 and the intermediate skin 106 with the two ends of a soundwave flow channel 118 that is arranged in the second cellular-structure core 108.

Other variants may be envisaged. In a first embodiment shown in FIG. 3A, the high-porosity zones 114a and 114b of a given pair communicate with the soundwave flow channel 118 via wells 116a and 116b passing both through the first cellular-structure core 102 and the intermediate skin 106.

In a second embodiment shown in FIG. 3B, the high-porosity zones 114a and 114b of a given pair communicate with the soundwave flow channel 118 via wells 116a and 116b passing through the first cellular-structure core 102 and through a plurality of orifices 120 formed through the intermediate skin 106 in register with the wells.

In a third embodiment shown in FIG. 3C, the high-porosity zones 114a and 114b of a given pair communicate with the soundwave flow channel 118 via passages 122a and 122b formed between the cavities in the first cellular-structure core 102 and a plurality of orifices 120 formed through the intermediate skin 106 in register with the passages 122a and 122b.

It should be observed that the intermediate skin 116 of the acoustic treatment panel of the invention is perforated by a plurality of orifices 124 with the exception of the zones covering the soundwave flow channel 118 that is arranged in the second cellular structure 108 (in other words, the zones of the intermediate skin overlying the soundwave flow channel are continuous). In these unperforated zones, the acoustic panel thus acts as a simple resonator with a porous layer beside the flow passage (i.e. the perforated wall 104) and an unperforated layer at the end of the cavity (i.e. the intermediate wall 106). In the perforated zones, the intermediate skin makes it possible for the acoustic treatment to operate as a double resonator and it presents a perforation ratio lying in the range 1% to 4% with orifices 124 having diameters of about 0.15 mm to 0.4 mm.

The soundwave flow channel 118 may be made in several different ways. In the embodiment of FIG. 3A, it is formed by a corridor defined laterally by the walls of cavities of the second cellular structure 108. For this purpose, the corridor may be obtained, for example, by means of a plurality of panels (or "slabs") of honeycomb-shaped cavity arrays, these panels being spaced apart in the lateral direction so as to form such corridors between them.

In a variant embodiment shown in FIGS. 3B and 3C, each soundwave flow channel 118 is formed by an array of adjacent cavities of the second cellular structure 108, which cavities communicate with one another via walls 122 presenting a high porosity ratio (the porosity ratio must be high enough to avoid acoustic coupling between the cavities concerned.

As mentioned above, the intermediate skin 116 is not perforated in the zones covering the soundwave flow channel 118, so the channel is defined laterally by walls of cavities in the second cellular structure 108 and in the height direction by unperforated partitions.

Furthermore, as shown in the embodiment of FIGS. 3A and 4A, the path formed by the soundwave flow channel 118 may be rectilinear, and thus extend substantially parallel to the longitudinal axis X-X of the turbojet. Under such circumstances, the inlet and outlet zones 114a and 114b are in alignment along the axis X-X.

Likewise, still in the embodiment of FIG. 4A, the inlet zones 114a may be regularly spaced apart circumferentially from one another and may be in alignment with one another on a common substantially transverse direction (i.e. perpendicular to the axis X-X). The same applies to the outlet zones 114b.

Naturally, other configurations may be envisaged. Thus, in the embodiment of FIG. 4B the outlet zone 114b is offset circumferentially relative to the inlet zone 114a and the soundwave flow channel 118 is not solely rectilinear.

It is also possible to devise other shapes that are more complex for the soundwave flow channels. In particular, the array of channels formed in the second cellular structure may be in the form of a genuine labyrinth that is followed by the soundwaves (with inlet zones upstream and outlet zones downstream). The path followed by the soundwaves in the second cellular structure is predetermined as a function of the phase delay it is desired to apply to the waves.

It should be observed that the various soundwave flow channels formed in an acoustic treatment panel of the invention may possibly communicate with one another via perforations.

Figure 5:
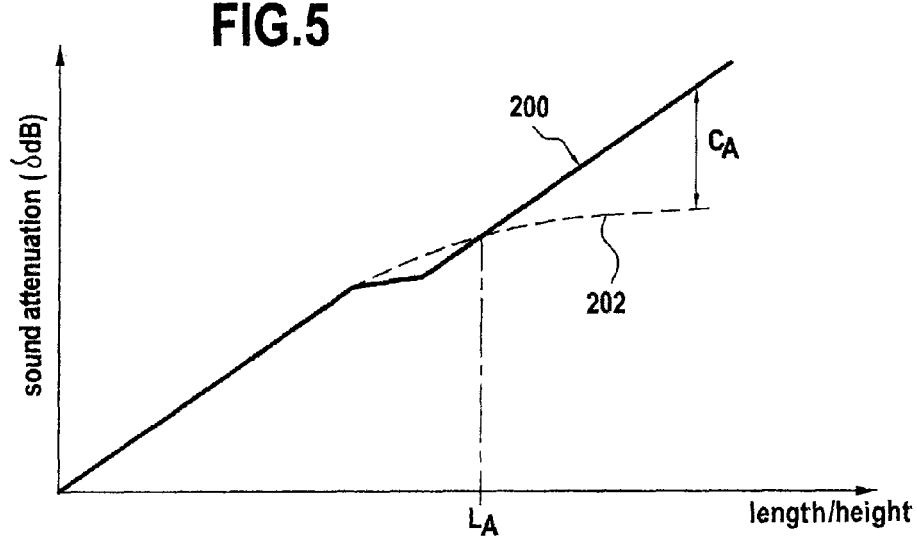
FIG. 5 is a graph plotting the increase in sound attenuation obtained by the acoustic treatment panel of the invention.

The acoustic attenuation benefit that is obtained by the acoustic treatment panel of the invention is shown by curve 200 in FIG. 5. This curve represents the sound attenuation (in decibels) relative to the length of the panel divided by the height of the cold stream flow passage of the turbojet. A dashed-line curve 202 shows the attenuation obtained with a conventional acoustic treatment panel. Beyond a certain relative length $L_A$ of the panel, it can be seen that a conventional acoustic treatment tends to stagnate in terms of sound attenuation. In contrast, the acoustic treatment panel of the invention makes it possible to obtain a considerable improvement in acoustic attenuation $C_A$ beyond this relative length $L_A$ of the panel.

The invention claimed is:

1. A multilayer acoustic treatment panel comprising:
   a first cellular-structure core sandwiched between a perforated skin and an intermediate skin; and
   a second cellular-structure core sandwiched between the intermediate skin and a continuous skin;
   wherein the perforated skin includes at least one pair of high-porosity zones presenting a perforation ratio greater than a perforation ratio of a remainder of the perforated skin and including an inlet zone and an outlet zone that are longitudinally spaced apart from each other, the high-porosity zones of a given pair communicating through the first cellular-structure core and the intermediate skin with two ends of a soundwave flow channel arranged in the second cellular structure core;
   wherein the intermediate skin is perforated except for zones overlying a portion of the first cellular-structure core bounded by the soundwave flow channel, the zones being continuous.

2. A panel according to claim 1, wherein the high-porosity zones of a given pair communicate with the soundwave flow channel via wells passing both through the first cellular-structure core and the intermediate skin.

3. A panel according to claim 1, wherein the high-porosity zones of a given pair communicate with the soundwave flow channel via wells passing through the first cellular-structure core and via a plurality of orifices formed through the intermediate skin.

4. A panel according to claim 1, wherein the high-porosity zones of a given pair communicate with the soundwave flow channel through passages formed between cavities of the first cellular-structure core and a plurality of orifices formed through the intermediate skin.

5. A panel according to claim 1, wherein the zones of the intermediate skin overlying the first cellular-structure core bounded by the soundwave flow channel.

6. A panel according to claim 1, wherein the soundwave flow channel is formed by a corridor that is defined laterally by walls of the second cellular-structure core.

7. A panel according to claim 1, wherein the soundwave flow channel is formed by an array of adjacent cavities of the second cellular-structure core that communicate with one another via porous walls.

8. A panel according to claim 1, wherein the perforated skin includes a plurality of pairs of high-porosity zones that are transversely spaced from one another.

9. A panel according to claim 8, wherein the inlet zones and the outlet zones are in alignment in directions that are substantially transverse relative to the panel.

10. A turbojet nacelle comprising at least one acoustic treatment panel according to claim 1 on an inside face thereof.

11. A nacelle according to claim 10, wherein the perforated skin of the acoustic treatment panel is in contact with a cold stream flow passage defined on an outside by the inside face of the nacelle.

12. A turbojet including at least one acoustic treatment panel according to claim 1 on an outside face thereof.

13. A turbojet according to claim 12, wherein the perforated skin of the acoustic treatment panel is in contact with a cold stream flow passage defined on an inside by the outside face of the turbojet.

* * * * *